(12) United States Patent
Womble et al.

(10) Patent No.: US 6,368,048 B2
(45) Date of Patent: Apr. 9, 2002

(54) TRANSPORT CART FOR ELONGATED OBJECTS

(76) Inventors: Edward A. Womble, Rte. 1 Box 292A; Altos V. Womble, Rte. 1 Box 290, both of Eustace, TX (US) 75124

( * ) Notice: Subject to any disclaimer, the term of this patent is extended or adjusted under 35 U.S.C. 154(b) by 0 days.

(21) Appl. No.: 09/189,442

(22) Filed: Nov. 10, 1998

(51) Int. Cl.$^7$ ................................................ B66F 11/00
(52) U.S. Cl. ........................ 414/590; 414/620; 414/621
(58) Field of Search ................................ 414/589, 590, 414/450, 453, 457, 620, 621, 622, 910, 911; 254/2 R, 3 R; 280/79.6, 79.5, 47.35

(56) References Cited

U.S. PATENT DOCUMENTS

| | | | |
|---|---|---|---|
| 639,286 A | * 12/1899 | Prevost | ........................ 254/3 R |
| 1,896,249 A | 2/1933 | Russell | |
| 2,455,017 A | 11/1948 | McCormick | |
| 2,615,238 A | 10/1952 | Highwood | |
| 2,624,483 A | * 1/1953 | Ketzel | ........................ 414/453 |
| 3,112,835 A | * 12/1963 | Gierhart | ................. 414/620 X |
| 4,300,751 A | * 11/1981 | Delaney | ...................... 254/2 R |
| 5,326,117 A | 7/1994 | Cook | |
| 5,642,898 A | 7/1997 | Wise | |
| 5,658,118 A | 8/1997 | Luca | |

FOREIGN PATENT DOCUMENTS

| | | | |
|---|---|---|---|
| FR | 638432 | * 2/1928 | .................. 414/457 |
| FR | 907018 | * 6/1945 | ................ 280/79.6 |

* cited by examiner

*Primary Examiner*—Donald W. Underwood
(74) *Attorney, Agent, or Firm*—Rick Matos; Innovar, L.L.C.

(57) ABSTRACT

The invention provides a cart for transporting elongated objects such as compressed gas cylinders and for moving the objects from a first surface having a first height to a second surface having a higher or lower second height. The cart is designed such that an object retainer which is pivotally mounted to the frame of the cart can be removably engaged with the object to be transported at a location which is at or near the center of gravity of the object. The cart of the invention can also comprise a height adjustable object retainer and a height adjustable object rest. The cart will be made movable by a moving means mounted on the base of the cart.

18 Claims, 4 Drawing Sheets

TRANSPORT CART FOR ELONGATED OBJECTS

FIELD OF THE INVENTION

The present invention is related to transport carts for transporting elongated objects from a first location to a second location, and in particular to a transport cart which is capable of transporting a compressed gas cylinder from a first height to a second height without changing the relative altitude of the cart.

BACKGROUND OF THE INVENTION

Carts for transporting compressed gas cylinders are well known and are routinely used in commercial and research environments wherein such cylinders are ubiquitous. The cylinders are generally found wherever a source of compressed gas is needed.

Compressed gas cylinders under pressure are generally heavy metal cylinders of substantial weight. Typically their weight is too great to be readily lifted by one operator and generally necessitates the service of two or more men working together. Given the current and ongoing need for more ergonomic methods of transporting heavy loads such as compressed gas cylinders, inventions which directly address the shortcomings of the prior art are always in need. Evidence of the longstanding need for improved handling and transportation equipment for compressed gas cylinders can be found in the patent art. U.S. Pat. No. 2,624,483 to Ketzel discloses a carrier for welding outfits wherein the carrier can be used as a transport trailer for dragging compressed gas cylinders behind a vehicle on a road and also for holding the compressed gas cylinders firmly in an upright position during use.

U.S. Pat. No. 1,896,249 to Russel discloses a carrier for compressed gas cylinders which can be used to manually transport two compressed gas cylinders. The carrier has a collapsible storage means so that the compressed gas cylinders need not be removed from the transporter while the cylinders are being used.

U.S. Pat. No. 5,658,118 to Luca discloses a transporter for compressed gas cylinders which comprises an elongated load-bearing beam which has attached to it a cylinder support yoke for cradling the compressed gas cylinder, a first set of wheels for transporting the compressed gas cylinder, a pair of rotatably attached wheels by which the load-bearing means will be supported when in an inclined upright position, and a hook for engaging with a valve cover of a compressed gas cylinder.

It will be understood after a review of the prior art that known transport carts or transporters for compressed gas cylinders do not provide means for transporting a compressed gas cylinder from a first surface having a first height to a second surface having a different second height. Known compressed gas cylinder transporters require manually lifting or lowering a compressed gas cylinder from a first height to a different second height. Thus, a need exists for a transport cart for compressed gas cylinders which will permit a user to easily transport the cylinder from a first surface having a first height to a second surface having a different second height while minimizing the effort required by the user to do so.

SUMMARY OF THE INVENTION

The present invention addresses the disadvantages of known transport carts for elongated objects and, thus, is generally directed to a versatile transport cart which can be used to transport compressed gas cylinders from a first surface having a first height to a second surface having a different second height. The construction of the present transport cart is such that it can be easily manufactured and adapted for use with a wide range of elongated objects, such as compressed gas cylinders, of a variety of sizes and dimensions. The cart of the present invention will permit facile lifting and relocation of elongated objects and can be used in a variety of commercial, industrial and residential applications.

In one aspect, the invention provides a cart for transporting elongated objects, the cart comprising:

a frame comprising a rear end, a front end, an upper portion and a base;

a receiving area defined by and disposed at said front end of said frame;

a retainer pivotally engaged with said frame for retaining an elongated object received in said receiving area; and moving means mounted on said base of said frame to permit moving said frame on a surface;

wherein a lower portion of said elongated object can be transported from a first height to a different second height, approximating a height of said retainer, by pivoting said retainer relative to said frame.

The retainer of the cart can be adapted to retain elongated objects, such as compressed gas cylinders, about a point approximating the center of gravity of the object. The retainer will be pivotally mounted with respect to the cart; therefore, an elongated object being retained by the retainer will be relatively easily pivoted about its center of gravity making it possible for the lower end of the object to be lifted to a height which approximates that of the retainer. The retainer can comprise one or more of a variety of different gripping means which are adapted to grasp, hold, or retain objects.

The cart of the invention can further comprise a rest which is disposed distal from the retainer and which is adapted to at least one of receive and retain an upper or lower portion of the elongated object when the object has been mounted onto the cart and pivoted about its center of gravity.

A cart according to the invention can further comprise a height adjuster which is telescopically engaged with the frame of the cart and which is pivotally engaged with the retainer so as to permit adjustment of the altitude of the retainer with respect to the altitude of the cart. In this embodiment, a cart resting on a first surface having a first height can be used to lift an elongated object from the first surface to a second surface having a higher or lower height relative to the first surface without changing the relative altitude of the cart. The height adjuster of the cart can comprise a variety of well-known manual, mechanical and/or automatic lifting means known to those of skill in the art.

The retainer can be pivotally engaged with the frame of the cart by essentially any known pivoting or hinge means. The cart of the invention can also include one or more storage areas for storing equipment, small compressed gas cylinders, tools, and other objects.

In another aspect, the present invention provides a cart for transporting compressed gas cylinders from a first surface having a first height to a second surface having a second height, said cart comprising:

a frame defining a cylinder receiving area at a first end thereof;

a cylinder retainer pivotally engaged with said frame and disposed adjacent said cylinder receiving area; and moving means affixed to said frame to permit movement of said cart;

wherein a lower portion of said gas cylinder can be raised to a height approximating that of said cylinder retainer.

According to one embodiment of the invention, the cylinder retainer can be made height adjustable relative to the cart such that the altitude of the cylinder retainer will change while keeping constant the altitude of the cart and the position of the cylinder retainer with respect to the cylinder. A particular embodiment of the invention also provides a cylinder retainer which height is adjustable with respect to the height of the cylinder. When a height adjustable cylinder retainer is used, a height adjustable cylinder rest can also be used. The cart can be adapted such that the height of the cylinder rest and the cylinder retainer can be adjusted simultaneously or independently of one another.

Other features, advantages and embodiments of the invention will be apparent to those skilled in the art by the following description, accompanying examples and appended claims.

BRIEF DESCRIPTION OF THE DRAWINGS

The following drawings are part of the present specification and are included to further demonstrate certain aspects of the invention. The invention may be better understood by reference to one or more of these drawings in combination with the detailed description of the specific embodiments presented herein.

DETAILED DESCRIPTION OF THE INVENTION

Figure 1:
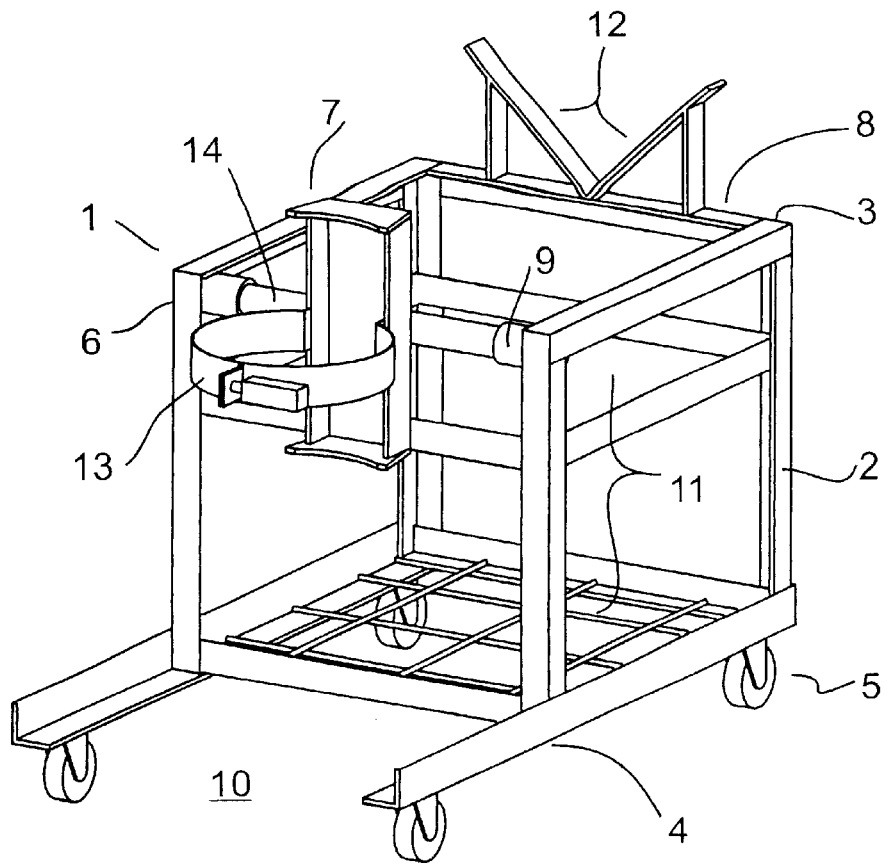
FIG. 1 is a perspective view of a first embodiment of the cart according to the invention.
Figure 2:
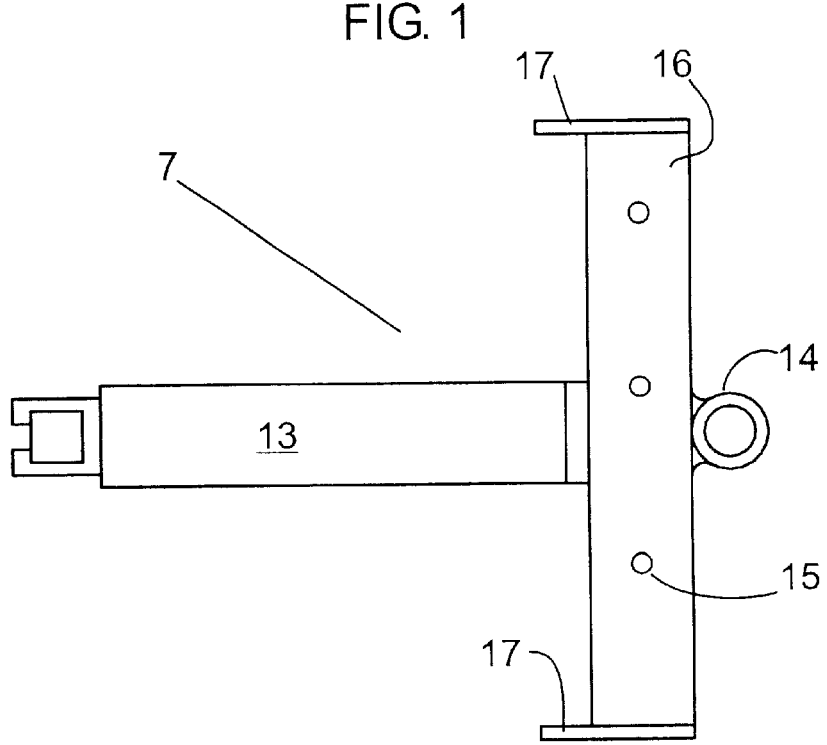
FIG. 2 is a side elevation view of a first embodiment of the retainer according to the invention.

Referring now to FIG. 1, the transport cart (1) of the invention includes a frame (2) having an upper portion (3), a base portion (4), a front end (6), and an upper rear end (8). Secured to the base portion (4) is moving means (5) which permits movement of the cart on a surface. A retainer (7) is pivotally engaged with the front end (6) by way of collars (9) which are secured to the frame (2). Referring also to FIG. 2, a retainer (7) comprises a fulcrum (14) which is pivotally engaged with the collars (9), a support (16) which is fixedly engaged with the fulcrum (14), one or more stabilizers (17) which are adapted to stabilize an elongated object being retained by the retainer (7), and gripping means (13) engaged with the support (16).

The gripping means is adapted to tightly grasp or grip an elongated object so as to provide a firm hold of the object. The gripping means (13) can be adjustable to permit gripping of a variety of objects having different dimensions. The gripping means (13) can be fixedly or adjustably engaged with the support (16) to permit the cart to be used with objects of a variety of different heights. The gripping means (13) can be adapted to grip elongated objects at locations which include or are disposed away from the object's center of gravity. A cart according to the invention can comprise one or more gripping means which are independently selected at each occurrence from any of a variety of means for removably gripping, grasping, holding a first object to a second object. By way of example and without limitation, gripping means according to the invention can include one or more of a strap, cable, chain, band, rope, or clamp.

The retainer (7) will be pivotally mounted with respect to the frame (2) such that an elongated object being retained by the retainer (7) can be pivoted about the fulcrum (14) of the retainer (7). The retainer (7) according to the invention can comprise any known pivoting or hinge-type joint such as a hinge, rotatable tube, rotatable rod, ball joint, knee joint, elbow joint, universal joint, rod or tube and collar combination, or combinations thereof.

Figure 3:
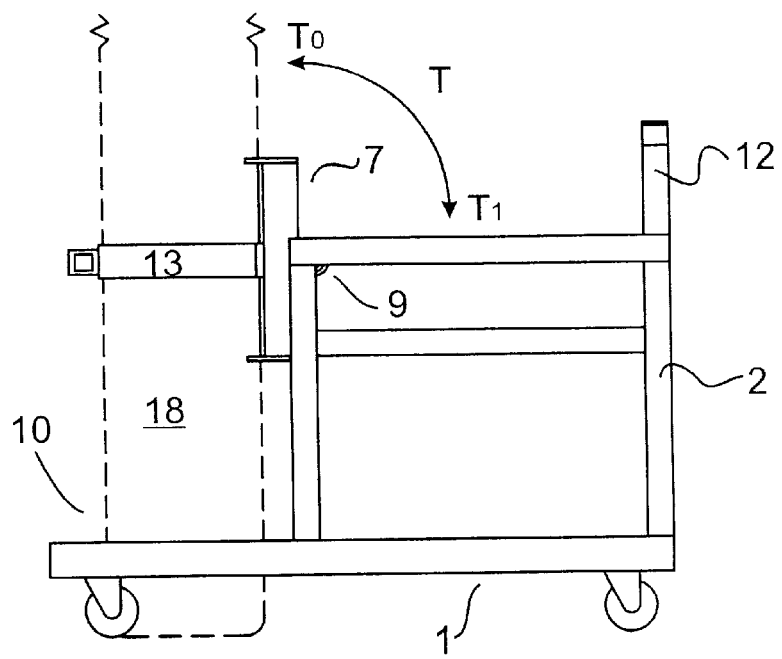
FIG. 3 is a side elevation view of the cart of FIG. 1 wherein a compressed gas cylinder has been received within the receiving area.
Figure 4:
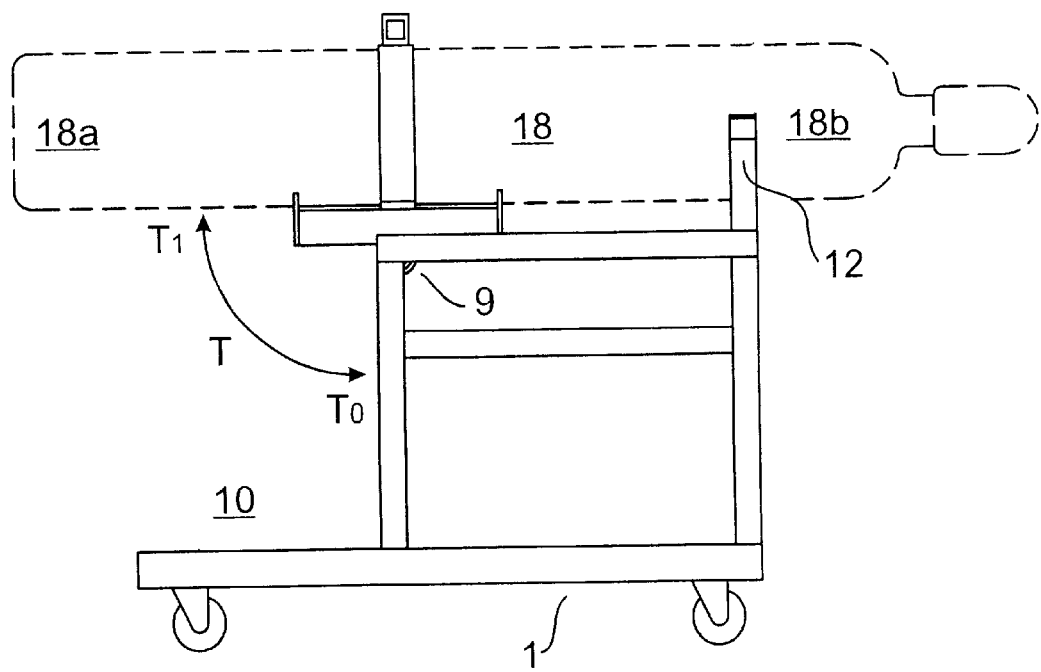
FIG. 4 is a side elevation view of the cart of FIG. 3 wherein the compressed gas cylinder has been tilted back onto a rest.

FIG. 3 depicts a compressed gas cylinder (18) being retained by the cylinder retainer (7) by way of the gripping means (13). The cylinder (18) is disposed within the receiving area (10) defined by the cart (1). Since the retainer (7) is pivotally mounted with respect to the frame (2), it can be tilted from a first position ($T_0$) to a second position ($T_1$) along the arc defined by the arrow (T) such that a top portion (18b) of the cylinder can rest within the cylinder rest (12) (see FIG. 4). It will be understood that the cylinder (18) can be held by the gripping means (13) at a point which approximates, is higher than, or is lower than the center of gravity of the cylinder. In preferred embodiment, the center of gravity of the cylinder (18) will be disposed within a range of about one-fourth to about three-fourths the height of the cylinder. In another preferred embodiment, the center of gravity of the cylinder will be disposed at a point which is about one-half the height of the cylinder. In another preferred embodiment, the optimal point on the cylinder at which the gripping means grips the cylinder will be that point which permits a user to both recline and stand the cylinder easily.

Figure 7:
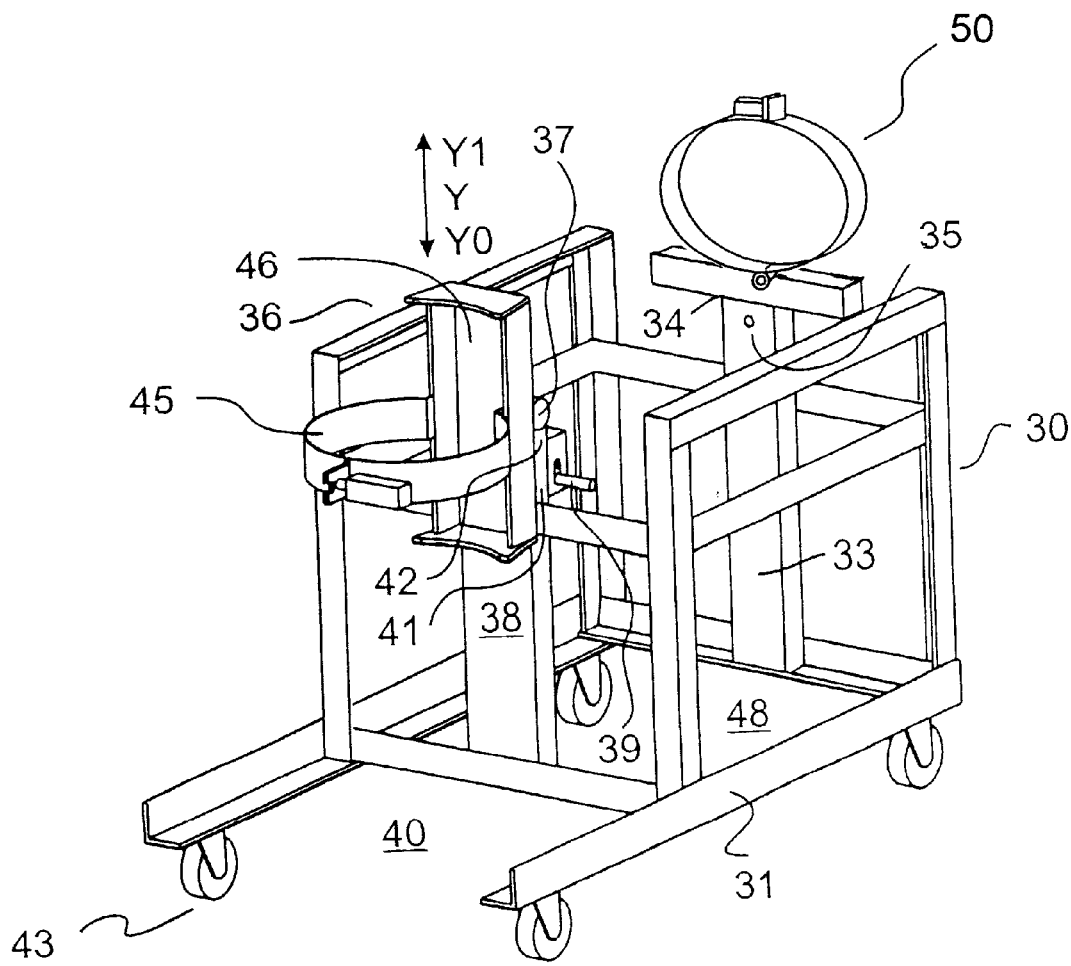
FIG. 7 is a perspective view of a fourth embodiment of the cart which includes a gripping means adjacent the rear end of the cart.

Although the cylinder rest (12) is depicted as being a V-shaped rest which does not grip, grasp, hold or retain the cylinder, a gripping means, such as exemplified by the gripping means (13), can be used in place of the cylinder rest (12). Accordingly, a cart according to the invention can comprise either a gripping means (50, in FIG. 7) or a cylinder rest to receive and optionally retain a portion of a cylinder being held by the retainer (7) when the cylinder, or elongated object, is reclined. The cylinder rest (12) can be shaped as desired to provide improved performance with a cylinder of a given dimension.

Figure 5:
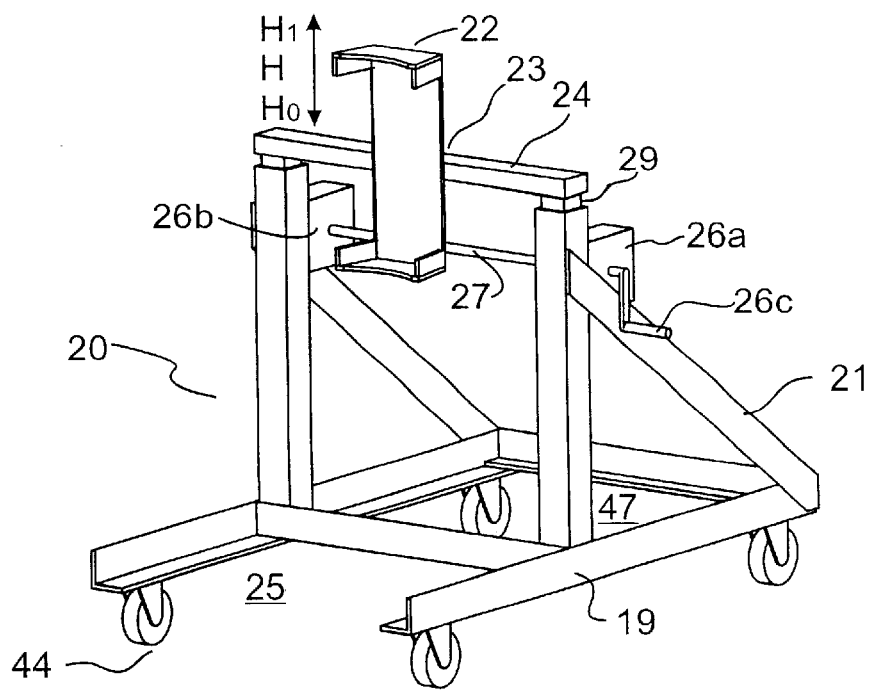
FIG. 5 is a perspective view of a second embodiment of the cart according to the invention having a height adjustable cylinder retainer.

FIG. 5 depicts another embodiment of the transport cart of the invention wherein the cart (20) comprises a frame (21) having a triangular portion, a height adjustable retainer (22), moving means (44) attached to the base portion (19) of the frame (21), and a receiving area (25) defined by the frame (21). When used in reference to the retainer (22) or gripping means of the cart, the phrase "height adjustable" refers to a component which altitude is adjustable with respect to the altitude of the cart. For example, the height adjustable retainer (22) has a height which is adjustable between a first position ($H_0$) and a second position ($H_1$) along the arrow indicated as (H). The retainer (22) is made height adjustable by way of a height adjuster, which in this exemplary embodiment, comprises a cross member (24) which is hingedly attached to or pivotally engaged with the retainer (22) and which has dual vertical downwardly extending support members (29) which are telescopically engaged with respective support members (28) of the frame (21). The exemplary height adjuster further comprises at least one gear box (26a) which is operably engaged with the vertical support (29) of the height adjuster such that when the gears (not shown) of the gear box (26a) are cranked, such as by a handle (26c), the height adjuster will move upwards or downwards as desired thereby changing the relative altitude of the retainer (22) with respect to the frame (21) and with respect to the surface upon which the cart (20) sits. In another preferred embodiment, the height adjuster will comprise a first gear box (26a) and a second gear box (26b) which are operably engaged by way of a drive (27). When the handle (26c) actuates the gears of the gear box (26a), the gears of the gear box (26b) will also be actuated. In this fashion, both of the vertical supports (29) will move upwards and downwards simultaneously in response to actuation of the gear boxes.

Figure 6:
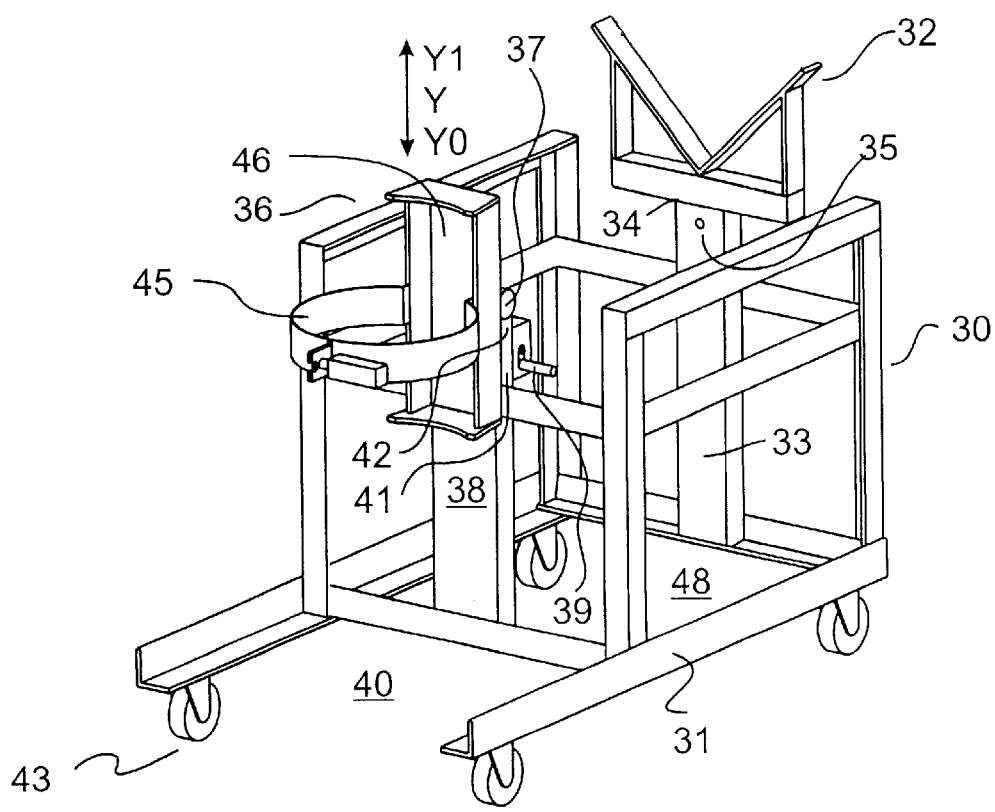
FIG. 6 is a perspective view of a third embodiment of the cart according to the invention which includes both a height adjustable retainer and a height adjustable rest.

Although the height adjuster can be a gear box, the height adjuster according to the invention can comprise a crank, gear box, sprocket, ratchet, toothed support, handle, chain, pulley, block and tackle pulley, gear and combinations thereof FIG. 6 depicts a third embodiment of the cart (30) according to the invention comprising a height adjustable retainer (36), a height adjustable rest (32), a frame (31), a receiving area (40), and moving means (43). The height adjustable rest (32) can comprise a telescopic mount comprising mating male (34) and female (33) components which can be locked at a relative height by way of the height locking means (35). The height adjustable rest can be a height adjustable gripping means and can also be operated by a crank, gear box, chain, pulley, and other such equipment known to the artisan of ordinary skill.

The height adjustable retainer (36) comprises a pivotal mount (37) which is pivotally engaged with a reciprocating telescopic support (42) which is adapted to be received by the support (38) of the cart (30). The telescopically engaged pair (42) and (38) are operated by a gear box (39) such that the height of the retainer (36) can be adjusted from a first position ($Y_0$) to a second position ($Y_1$) along the arrow indicated as (Y). The gear box can further comprise a locking means (41) to maintain the gear box locked at a given position.

It will be understood by those of ordinary skill in the art that the retainer (36) and portions thereof can be independently height adjustable. For example, the retainer of FIG. 6 comprises an adjustably mounted gripping means (45) which height can be adjusted relative to the support member (46) so that the gripping means (45) can grasp or hold an elongated object at different points relative to the height or center of gravity of the object. Additionally, the retainer (36) is pivotally engaged with the height adjuster by way of the pivotal mount (37) such that once an object is being held by the gripping means (45), the object can be lifted from the ground without changing the position of the pivot (37) relative to the center of gravity of the cylinder (not shown).

As depicted in the attached figures, the cart for transporting elongated objects according to the invention can comprise metal, plastic, alloys, and other rigid materials to form the frame and various elements of the cart. It will be understood by those of skill in the art that essentially any rigid material which is durable, hard, tough, and wear resistant enough to tolerate use in commercial and industrial environments should be suitable in constructing the cart of the invention.

A cart according to the invention can be used to transport elongated objects such as tubes, cylinders, rods, poles, beams, planks, joists, or boxes. The cart of the present invention can also be used, but is not limited necessarily to being used, in transporting compressed gas cylinders.

The cart according to the invention can also be used to transport other articles; therefore, the cart can further comprise one or more storage areas for storing and/or retaining such other articles during transport. The storage areas can be disposed within the framework of the body or attached externally thereto. The storage areas can comprise shelves, trays, drawers, boxes, bins or other such storage areas known to those of ordinary skill in the art. FIGS. 1, 5 and 6 depict storage areas (11, 47, 48) which are defined by the frames (2, 28, 31), respectively, of the carts (1, 20, 30).

Although depicted herein as a strictly open body structure, the frame of the cart can comprise walls or other flat structures in place of the angle iron, iron rod or metal strap used to build the cart of the invention. The wall portions of the cart can be disposed such that one or more trays, compartments, bins, cabinets or closed sections will be formed in the cart. Such closed sections may be used as storage areas. Although the frame which comprises the cart according to the invention has been depicted as generally being box shaped, the frame and thus the cart of the invention can be shaped as desired, for example, as a circle, sphere, rectangle, paraboloid, trapezoid, cube, cone, beam, pyramid, I-beam, or other such geometric figures.

As used herein, the moving means (5, 43, 44) which comprise the carts of the invention and upon which the frames of the carts of the invention are mounted, can include essentially all known means which permit relocation or transportation of a solid rigid object upon a surface. By way of example and without limitation, the moving means can comprise castors, wheels, tires, bearings, rollers, drums and other such means known to those of skill in the art.

As used herein, the term "receiving area" shall refer to an area which is defined by the frame of the cart according to the invention and which is capable of receiving an elongated object such as a compressed gas cylinder. The receiving area will more preferably be defined by an extended base portion of the cart. The extended base portion of the cart can protrude away from the main body portion of the cart to a distance beyond the diameter of an elongated object being retained by the cart.

The stabilization means which comprise the retainer of the invention are intended to stabilize an elongated object once it has been retained by the retainer to avoid dislocation of the object relative to the retainer. The stabilization means can comprise a plate, support, bracket, V-shape, U-shape, or other such structure which was useful in stabilizing the disposition of a first object relative to a second object.

In order to maintain the retainer, gripping means, moving means or height adjuster at a given location, position or height, each can further comprise one or more locking means. For example, a first locking means can be used to keep the retainer in a vertical position; a second locking means can be used to lock the moving means and keep the cart in place; a third locking means can be used to lock a first height adjuster to keep the retainer at a given height; and a fourth locking means can be used to lock a second height adjuster to keep the rest at a given height.

The above is a detailed description of particular embodiments of the invention. It is recognized that departures from the disclosed embodiments may be made within the scope of the invention and that obvious modifications will occur to a person skilled in the art. Those of skill in the art should, in light of the present disclosure, appreciate that many changes can be made in the specific embodiments which are disclosed herein and still obtain a like or similar result without departing from the spirit and scope of the invention. All of the embodiments disclosed and claimed herein can be made and executed without undue experimentation in light of the present disclosure.

What is claimed is:

1. A cart for transporting elongated objects, the cart comprising:
   a frame comprising a rear end, a front end, an upper portion and a base;
   a receiving area defined by and disposed at said front end of said frame;
   a retainer pivotally engaged with said frame for retaining an elongated object received in said receiving area;
   a rest disposed adjacent said rear end upon which an upper portion of said object rests when said object is retained by said retainer and said retainer is pivoted relative to said frame;
   gripping means disposed adjacent said rear end to retain the upper portion of an elongated object retained by the retainer when said elongated object is pivoted rearwardly relative to said frame; and
   moving means mounted on said base of said frame to permit moving said frame on a surface;
   wherein a lower portion of said object can be transported from a first height to a different second height, approximating a height of said retainer, by pivoting said retainer relative to said frame.

2. The cart of claim 1, wherein said retainer comprises:
   a support;
   a fulcrum fixedly attached to said support; and
   gripping means attached to said support;
   wherein said fulcrum is pivotally engaged with said frame.

3. The cart of claim 1, wherein said retainer comprises one or more gripping means.

4. The cart of claim 3, wherein said one or more gripping means is independently selected at each occurrence from the group consisting of:
   a strap, cable, chain, band, rope, and clamp.

5. The cart of claim 1 wherein said rest comprises a height adjuster such that said rest is a height adjustable rest.

6. The cart of claim 1 further comprising a first height adjuster telescopically engaged with said frame and pivotally engaged with said retainer to permit adjustment of a height of said retainer relative to said frame.

7. The cart of claim 6, wherein said first height adjuster comprises one or more of the following:
   a crank, gear box, sprocket, ratchet, toothed support, handle, chain, pulley, block and tackle pulley, and gear.

8. The cart of claim 1, wherein said retainer is pivotally engaged with said frame by way of one of a hinge, rotatable tube, rotatable rod, ball joint, knee joint, elbow joint, and universal joint.

9. The cart of claim 1 further comprising one or more storage areas.

10. A cart for transporting elongated objects from a first surface having a first height to a second surface having a second height, said cart comprising:
    a frame defining a receiving area at a first end thereof and having a second end;
    a retainer pivotally engaged with said frame and disposed adjacent said receiving area;
    a rest disposed adjacent said second end upon which an upper portion of said object can rest when said object is retained by said retainer and said retainer is pivoted relative to said frame;
    gripping means disposed adjacent said second end to retain an upper portion of an elongated object retained by the retainer when said elongated object is pivoted rearwardly relative to said flame; and
    moving means affixed to said frame to permit movement of said cart;
    wherein a lower portion of an elongated object being transported can be raised to a height approximating that of said retainer.

11. The cart of claim 10, wherein said second height is higher than said first height.

12. The cart of claim 10, wherein said cart can transport an elongated object from said first height to said second height without changing the relative altitude of said cart.

13. The cart of claim 10, wherein said retainer comprises a height adjuster such that said retainer is a height adjustable retainer which height is adjustable relative to said frame.

14. The cart of claim 13 wherein said height adjuster is telescopically engaged with said frame and pivotally engaged with said retainer.

15. The cart of claim 14, wherein said rest further comprises a second height adjuster such that said rest is a height adjustable rest.

16. The cart of claim 10 further comprising one or more storage areas.

17. The cart of claim 10 wherein said retainer is disposed adjacent the center of gravity of an elongated object being transported by the cart such that said elongated object can be pivoted about its center of gravity when being retained by said retainer.

18. A method of transporting a compressed gas cylinder from a first location having a first height to a second location having a second height by using a transport cart as defined in claim 10, the method comprising the steps of:
    engaging a cylinder in the receiving area with the retainer;
    pivoting the retainer toward the second end of the frame such that the upper end of the cylinder is disposed upon the rest;
    engaging the gripping means with the cylinder;
    moving the cart from the first location to the second location;
    disengaging the gripping means from the cylinder;
    disengaging the cylinder from the retainer; and
    pivoting the retainer toward the first end of the frame such that the lower end of the cylinder rests upon the second location.

* * * * *